US008191737B2

(12) United States Patent
Schneider

(10) Patent No.: US 8,191,737 B2
(45) Date of Patent: Jun. 5, 2012

(54) APPARATUS FOR STORING, DISPENSING, AND MEASURING DRY GRANULAR OR POWDERED MATERIALS

(76) Inventor: Cheryl Fortes Schneider, Los Gatos, CA (US)

( * ) Notice: Subject to any disclaimer, the term of this patent is extended or adjusted under 35 U.S.C. 154(b) by 288 days.

(21) Appl. No.: 12/467,570

(22) Filed: May 18, 2009

(65) Prior Publication Data

US 2009/0302068 A1    Dec. 10, 2009

Related U.S. Application Data

(60) Provisional application No. 61/131,325, filed on Jun. 9, 2008.

(51) Int. Cl.
*G01F 11/18*    (2006.01)
*G01F 11/14*    (2006.01)
*G01F 11/10*    (2006.01)
*G01F 11/00*    (2006.01)
*B67D 7/22*    (2010.01)
*B65D 88/54*    (2006.01)

(52) U.S. Cl. .......... 222/344; 222/43; 222/305; 222/425; 222/438; 222/444

(58) Field of Classification Search .............. 222/23, 222/41, 43, 287, 305, 344, 367, 424.5, 441, 222/444, 450, 547, 555, 425, 438, 440; 141/280
See application file for complete search history.

(56) References Cited

U.S. PATENT DOCUMENTS

| 4,560,092 | A | * | 12/1985 | Souza | 222/168 |
| 4,708,265 | A | * | 11/1987 | Bopst et al. | 222/43 |
| 5,833,097 | A | * | 11/1998 | Ruth | 222/368 |
| 5,975,366 | A | * | 11/1999 | Ridgley | 222/132 |
| 7,748,579 | B1 | * | 7/2010 | Shin | 222/450 |
| 2007/0000953 | A1 | * | 1/2007 | Ranney | 222/450 |

* cited by examiner

Primary Examiner — Darren W Gorman

(57) ABSTRACT

An apparatus for storing, dispensing, and measuring dry granular and powdered materials with an adjustable measuring cup device to which the apparatus may be removably attached for separate use, the measuring cup device capable of accurately measuring a desired volume of the materials dispensed from the apparatus, a main housing having a container reservoir for storing the materials to be dispensed, a housing compartment for housing the measuring cup device therein; a dispensing hole in between the container reservoir and the housing compartment, and a dispensing disc with an outwardly extending lever for opening and closing the dispensing hole for filling the measuring cup device. A preferred embodiment includes the filling hole of the top wall includes a removably attached air-tight lid for covering the container reservoir and to help preserve the freshness of the materials stored in the container cavity.

13 Claims, 7 Drawing Sheets

APPARATUS FOR STORING, DISPENSING, AND MEASURING DRY GRANULAR OR POWDERED MATERIALS

CROSS REFERENCE TO RELATED APPLICATIONS

This application is based on provisional application Ser. No. 61/131,325, filed on Jun. 9, 2008.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of measuring containers and more specifically to an apparatus for storing, dispensing, and measuring dry granular and powdered materials.

Measuring Containers that measure a predetermined quantity of dry material from a container are known in the prior art.

U.S. Pat. No. 4,560,092 describes a device generally including a container having a dispensing member and a measuring chamber. The measuring chamber is varied by an adjustment member. To operate the device, a handle is clocked to dispense the material from the container in single measurement increments at a time. The device can only dispense single predetermined measurement increments at a time. The measuring chamber then empties by gravitational flow through the chute into any suitable container. The handle is then released to permit the spring to return the member to the quiescent position, where the measuring chamber is refilled. To alter the amount of granular material dispensed, the device needs to be disassembled and reassembled by removing a screw and the container member. The adjustment member is then accessible to be rotated to change the spacing of the walls and to set a new volume for the measuring chamber.

U.S. Pat. No. 4,708,265 describes a device that measures and dispenses dry materials from a housing generally including a canister type holder and an adjustable drawer. The drawer is compartmentalized into measured divisions for measuring the materials from the canister. The operate the device, a user pushes in the drawer, removes the cover from the housing, adds the materials to be dispensed into the housing, adjusts the height of an index member into a slot representing the desired quantity of material to be dispensed, positions the unit over a receiving container, pulls out a tab and the drawer to discharge the material into the receiving container, and then reinserts the drawer to refill the container. Separate interchangeable drawers can be provided to accommodate other measurement volume increments.

While these devices fulfill their respective, particular objectives and requirements, there are several drawbacks to their design. First, the devices can only measure identical quantities of material at a time. In order to adjust the incremental quantity of the materials being measured, a user is required to disassemble or interchange one or more parts within the apparatus with no regard for measurement accuracy. Second, the operation of these devices requires several manual or reiterative steps such as having to re-clock the device in order to obtain another portion of the same quantity of material. Third, the inventions either include a receiving container for collecting the dispensed materials; require positioning the device over a separate receiving container for collecting the dispensed materials; or inserting a separate receiving container into the device to receive the discharged materials from the container. In either case, additional steps and components are required.

Other apparatuses have been proposed such as U.S. Pat. No. 5,975,366 which includes a motor for automating the measuring and dispensing functions. But, such apparatuses require several parts and complex assemblies. For the purpose of manufacturing and mass production, these are well-known obstacles.

The present invention is designed to be a better measuring container, for broad market appeal, and that overcomes the shortcomings in the prior art. Unlike the prior art, the present invention is quick and easy to use and requires minimal parts or assembly. The present invention is designed to accurately measure any incremental quantity of dry materials dispensed from its container in a single operation, have few parts with minimal assembly requirements for ease of manufacturability and mass production, be compact and space-efficient for maximizing kitchen storage space, be air-tight for preserving the freshness of the materials being stored in the container member when not in use, and combine the measuring and receiving functions so as to reduce the steps and components needed for operating the device.

BRIEF SUMMARY OF THE INVENTION

An object of the invention is to provide a better measuring container that can accurately measure any incremental quantity of dry materials dispensed from its container in a single operation Another object of the invention is to provide a better measuring container that can appeal to a broad market.

Another object of the invention is to provide a better measuring container that is quick and easy to use and does not require a user to disassemble or interchange parts.

A further object of the invention is to provide a measuring container that is easy to clean and is dishwasher safe.

Yet another object of the invention is to provide a better measuring container that has few parts and can be easily manufactured and mass produced Still yet another object of the invention is to provide a better measuring container that is compact and space-efficient for maximizing kitchen storage space.

Another object of the invention is provide a solution for saving users time, steps, labor, clean-up, and kitchen clutter while preparing their dry materials for cooking and baking.

Another object of the invention is to provide a better measuring container that helps to preserve the freshness of the dry materials being stored in its container.

A further object of the invention is to provide a quicker, easier, and less messy, solution to using traditional measuring cups.

Yet another object of the invention is to provide a compact device that can fit in standard kitchen pantries or cabinets rather than taking up counter-top space or for mounting on walls.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a apparatus for storing, dispensing, and measuring dry granular and powdered materials comprising: An adjustable measuring cup device to which said apparatus may be removably attached for separate use, wherein said measuring cup device capable of accurately measuring a desired volume of said materials dispensed from said apparatus, a main housing having a main top wall, a bottom base, and a main peripheral wall being attached to and extending between said main top wall and said bottom base, said top wall having a filling hole for filling a container reservoir on said main housing with said dry materials to be dispensed, a partition wall positioned between said main top wall and said base for dividing said housing into a top portion and a bottom portion, said top portion defined by a container reservoir formed in between said top wall and said partition wall for storing said materials to be dispensed, said bottom portion defined by a housing compartment formed in between said partition wall and said base for housing said adjustable measuring cup device therein, said partition wall having a dispensing hole extending there-through for distributing said materials from said container reservoir into said measuring cup device, and a dispensing disc rotationally coupled to said partition wall having an outwardly extending lever for facilitating rotation of said dispensing disc into a plurality of opened and closed positions with respect to said dispensing hole of said partition wall.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

As best illustrated in FIGS. 1 through 10, the storing, dispensing, and measuring apparatus 3 is adapted for storing and distributing dry granular or powdered materials from a container reservoir 2 into a selectively adjustable measuring cup device 15 to which may be removably attached from the apparatus 3 for separate use; wherein the measuring cup device 15 is capable of accurately measuring any incremental volumetric quantity of materials dispensed from the apparatus 3.

Figure 1:
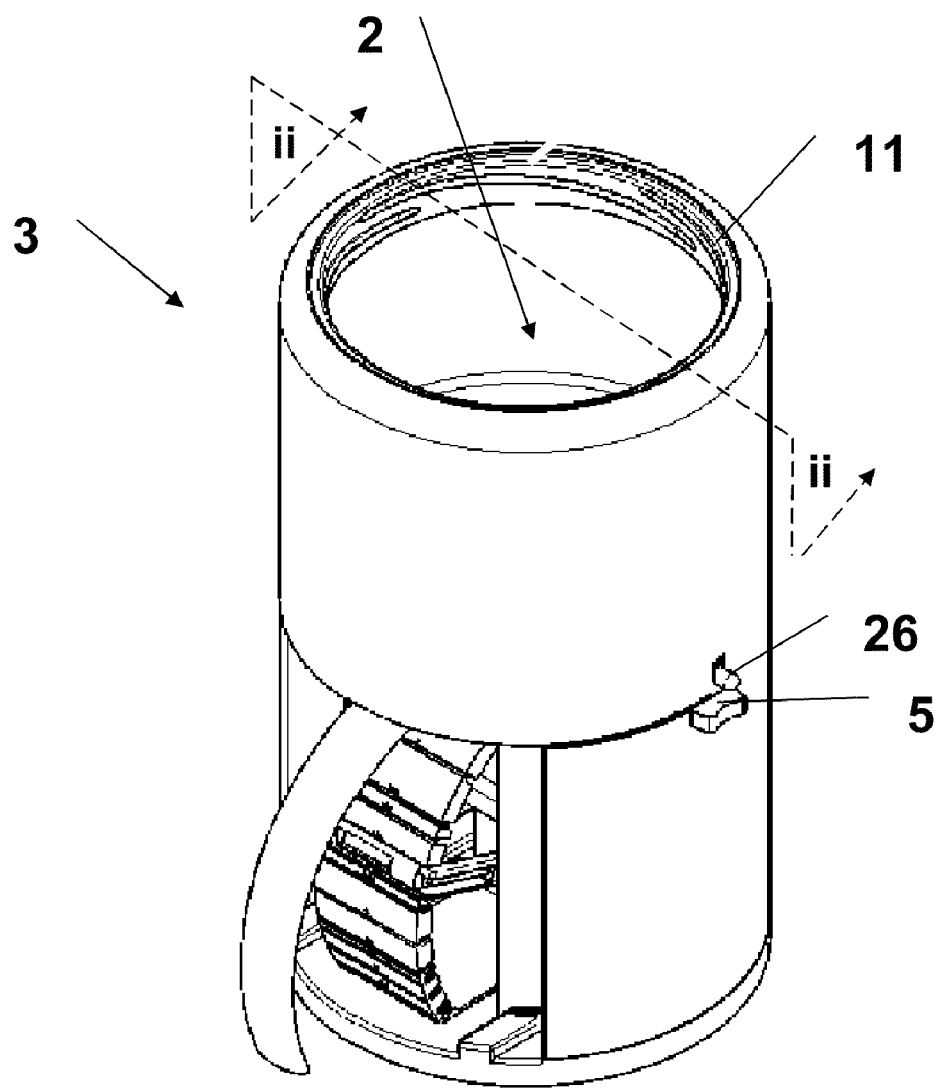
FIG. 1 is a perspective view of the apparatus
Figure 2:
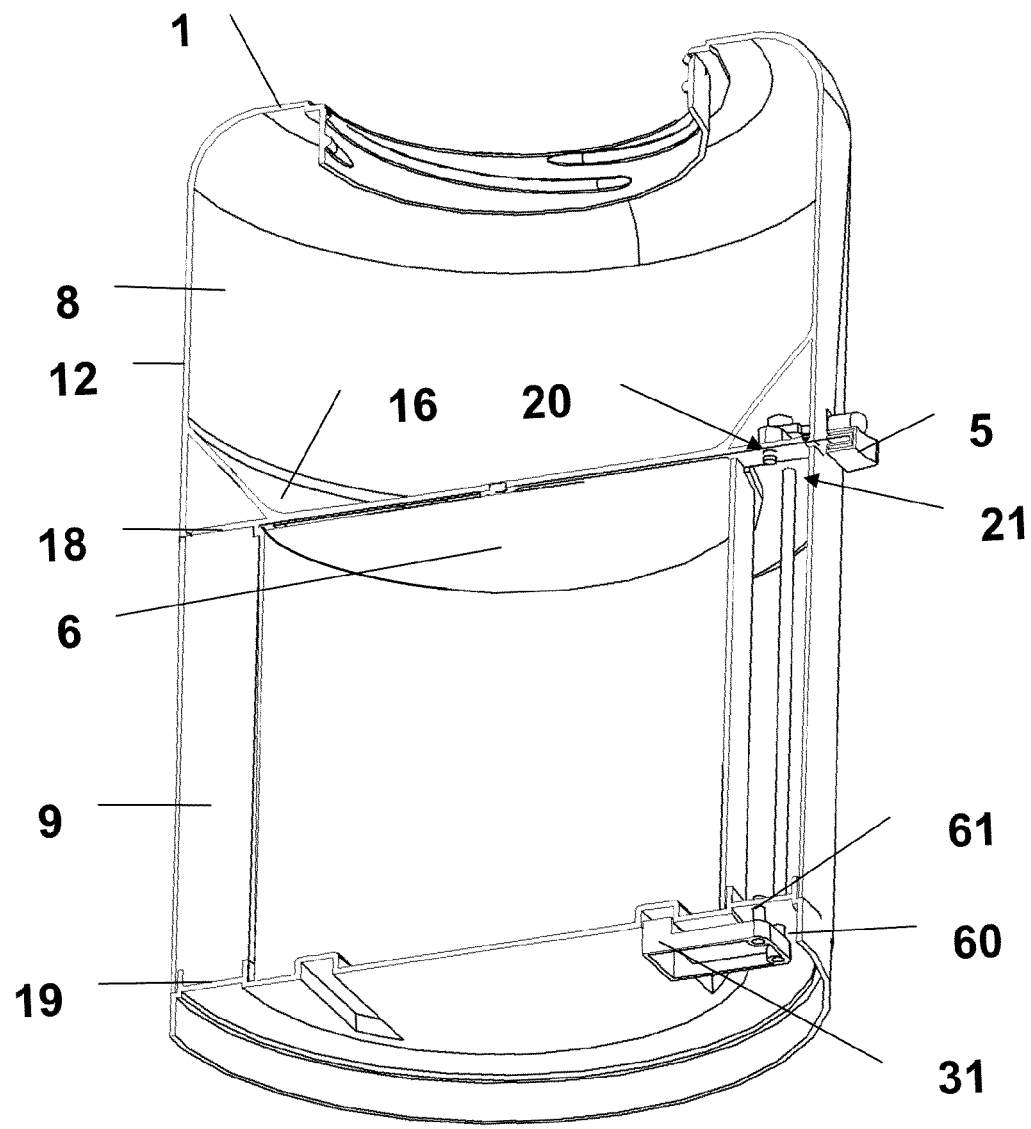
FIG. 2 is a cross sectional view of the apparatus main housing along the line ii-ii
Figure 3:
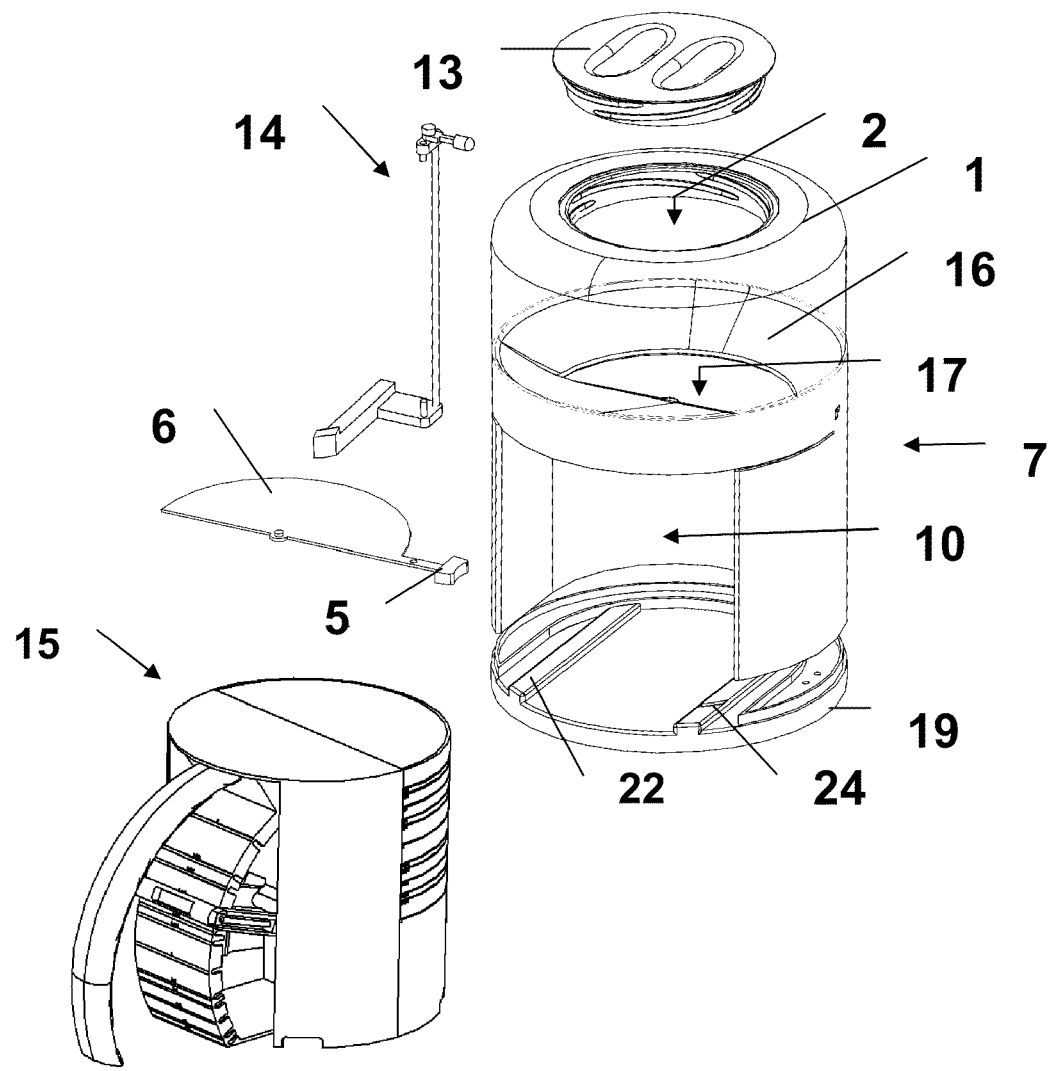
FIG. 3 is an exploded view of the apparatus

In FIGS. 1 through 3, the apparatus 3 generally comprising a cylindrical main housing 7 defined by a top wall 1, a bottom base 19, a main peripheral wall 12 being attached to and extending between the top wall 1 and the base 19, and a partition wall 18 positioned between the top wall 1 and the base 19 for dividing the apparatus main housing 7 into a top portion 8 and a bottom portion 9.

The top portion 8 of the apparatus main housing 7 is defined by a container reservoir 2 formed in between the top wall 1 and the partition wall 18 for storing a volume of dry materials to be dispensed into the measuring cup device 15 below.

The bottom portion 9 of the apparatus main housing 7 is defined by a housing compartment 10 formed in between the partition wall 18 and the base 19 for housing the measuring cup device 15.

The top wall 1 of the apparatus main housing 7 has a filling hole 11 for filling the container reservoir 2 with a volume of dry granular or powdered materials. In FIG. 2, the filling hole 11 also includes an air-tight lid 13 in removable communication with respect thereto for covering the container reservoir 2 and to help preserve the freshness of the materials stored therein.

The partition wall 18 has a dispensing hole 17 extending there through for distributing the materials from the container reservoir 2 into the measuring cup device 15 below.

In FIGS. 2 and 3, the container reservoir 2 further includes a downwardly sloping ramp 16 for facilitating the distribution of materials through a dispensing hole 17 on the partition wall 18 of the apparatus main housing 7 by means of gravity for filling the measuring cup device 15.

The dispensing hole 17 of the partition wall 18 is generally semi-circular in shape and configured for alignment into communication with a receiving hole 36 on the measuring cup device 15 for sufficiently distributing the materials from the container reservoir 2 through the dispensing hole 17 into the measuring cup device 15 without spilling.

A dispensing disc 6 with an outwardly extending dispensing lever 5 is rotationally coupled to the partition wall 18 for partially or fully covering the dispensing hole 17 on the partition wall 18. A dispensing disc 6 rotationally coupled to the partition wall 18 having an outwardly extending lever 5 for facilitating rotation of the dispensing disc into a plurality of opened and closed positions with respect to the dispensing hole of the partition wall. The dispensing disc 6 further prevents the materials from leaking out of the container reservoir 2 when in fully closed position.

The dispensing lever 5 on the dispensing disc 6 is actuated by sliding the lever 5 laterally across the apparatus main housing 7 so as to open or close the dispensing hole 17. When the dispensing lever 5 is opened, the materials from the container reservoir 2 are distributed through the dispensing hole 17 and into the measuring cup device 15 below for filling the measuring cup device 15 with a desired amount of material. When the dispensing lever 5 is fully closed, the dispensing disc 6 is adapted for preventing the materials from leaking out through the dispensing hole 17 and for helping to keep the container reservoir 2 air-tight. By sliding the dispensing lever 5 to closed position, the dispensing disc simultaneously cuts through the dry material in the measuring cup device 15 thereby leveling the material within the measuring cup device 15 for ensuring measurement accuracy.

In FIG. 2, the base 19 of the apparatus main housing further includes track guide members 22 for guiding the measuring cup device 15 straight into the housing compartment 10 so as to align the measuring cup device 15 with the dispensing hole 17 on the partition wall 12. When the measuring cup device 15 is inside the housing compartment 10, the receiving hole 36 on the measuring cup device is directly aligned with the dispensing hole 12 of the partition wall 39 so as to sufficiently fill the measuring cup device 15 without spilling.

In the next section, the removable adjustable measuring cup device 15 is best illustrated in FIGS. 5 through 10. The measuring cup device 15 is adapted for accurately measuring a volume of dry materials dispensed from the container reservoir 2 of the apparatus main housing 3.

The measuring cup device 15 is housed in the housing compartment 10 of the apparatus main housing 7. The measuring cup device 15 is adapted for removable communication with respect thereto so as to be separable from the apparatus 3.

The measuring cup device 15 generally comprises a cylindrical cup body for including a cup top end 32, a cup bottom end 33; and a peripheral cup wall 34 being attached to and extending between the cup top end 32 and the cup bottom end 33 so as to form the cup body.

The cup top end 32 of the measuring cup device 15 includes a receiving hole 36. The receiving hole 36 extends downwardly from the cup top end 32 and through the measuring cup device 15 towards the cup bottom end 33 so as to form a cup cavity 37 for filling the measuring cup device 15. When the measuring cup device 15 is inside the housing compartment 10, the receiving hole on the cup cavity 37 is in direct alignment with respect to the dispensing hole 17 of the partition wall 18 of the main housing 15 so as to sufficiently fill the measuring cup device 15 without spilling.

The receiving hole 36 on the measuring cup device 15 is configured to directly align into communication with the dispensing hole 17 on the partition wall 18 for receiving materials from container reservoir 2 through dispensing hole 17 for filling the measuring cup device 15 without spilling.

The cup bottom end 33 includes track guide slots 35 for aligning into communication with the track guide members 22 on the base 19 of the apparatus main housing 7.

A cup handle 38 is positioned on the cup periphery 34 of the measuring cup device 15 for easily removing the measuring cup device 15 from the housing compartment 10 and for convenient handling of the measuring cup device 15 when used separately from the apparatus 3.

A fixing member 39 is also positioned on the cup periphery 34 of the measuring cup device 15. The fixing member 39 comprises a plurality of notches 41. A plurality of measurement indicia 40 is positioned on the outer surface of the fixing member 39. Each of the measurement indicia 40 is positioned adjacent to one of the plurality of notches 41.

The measuring cup device 15 further includes an adjusting means 42 for selectively adjusting the volume of said cup cavity into a plurality of accurate predetermined measurement volumes. The adjusting means is further adapted for fixedly engaging with one of the plurality of notches 41 of the fixing member 39 in releasable communication therewith so as to securely fix the adjusting means 42 to a desired measurement volume position with respect to the cup cavity 37.

The adjusting means 42 generally includes a slidably disposed disc member 48, two sets of lever means wherein each set comprises of one lever 43 and one lever 44, a catch engagement means 46 with a reader member 47.

The disc member 48 generally includes a top portion 49 and a bottom portion 50. The top portion 49 and the bottom portion 50 are joined together to form the disc member 48. The disc member 48 is configured for longitudinal movement with respect to the cup cavity 37. The outer peripheral edge of the disc member 53 is configured for having sufficient contacting relation with respect to the cup cavity inner walls 57 so as to form a substantial seam 58 between the disc member 48 and the inner cavity walls 57 for preventing materials from passing through the seam 58.

Figure 10:
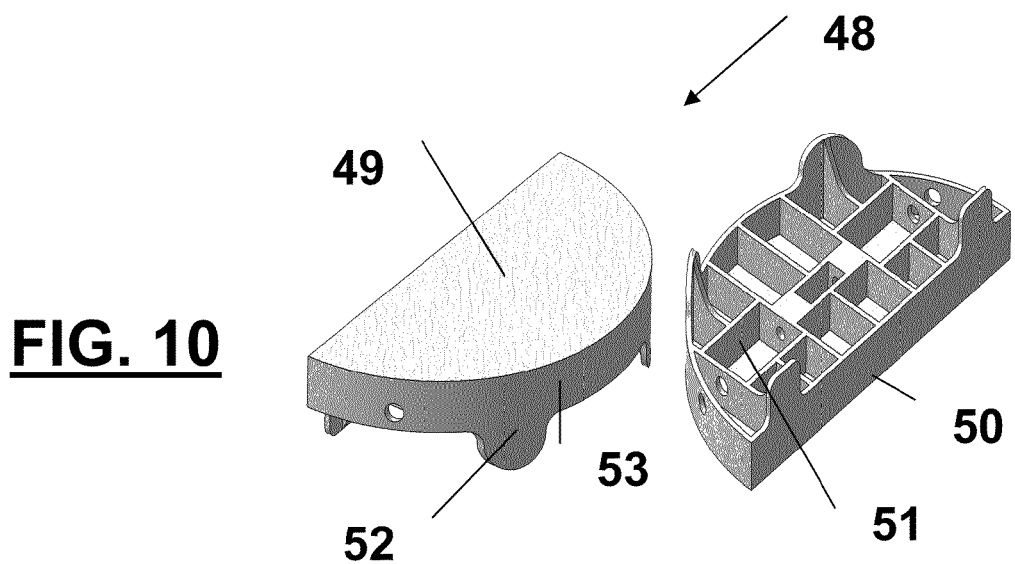
FIG. 10 is an exploded view the dispensing disc of the adjusting means

In FIG. 10, the disc member further includes ribs 51 for lightening and protrusions 52 to keep the disc member 48 from flipping inside the cup cavity 37.

Figure 8:
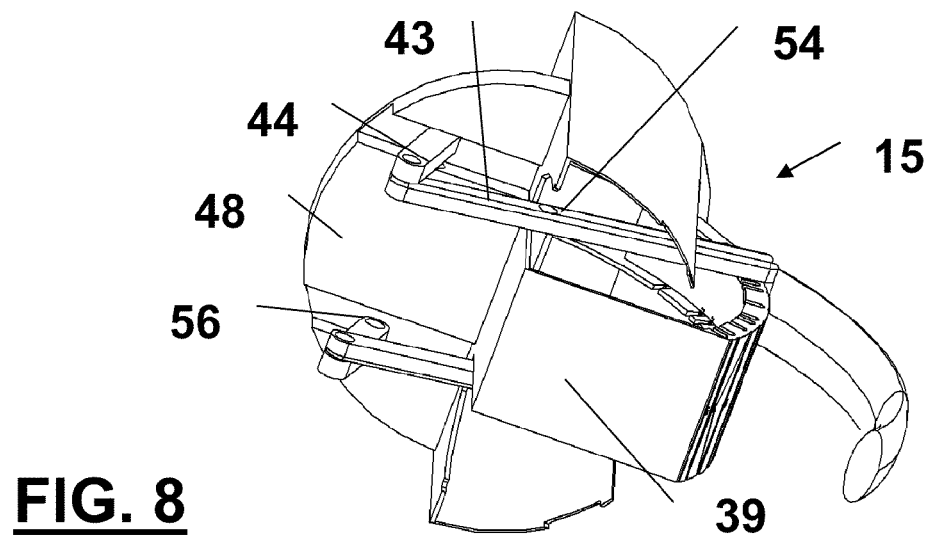
FIG. 8 is a perspective bottom-view of the measuring cup device
Figure 9:
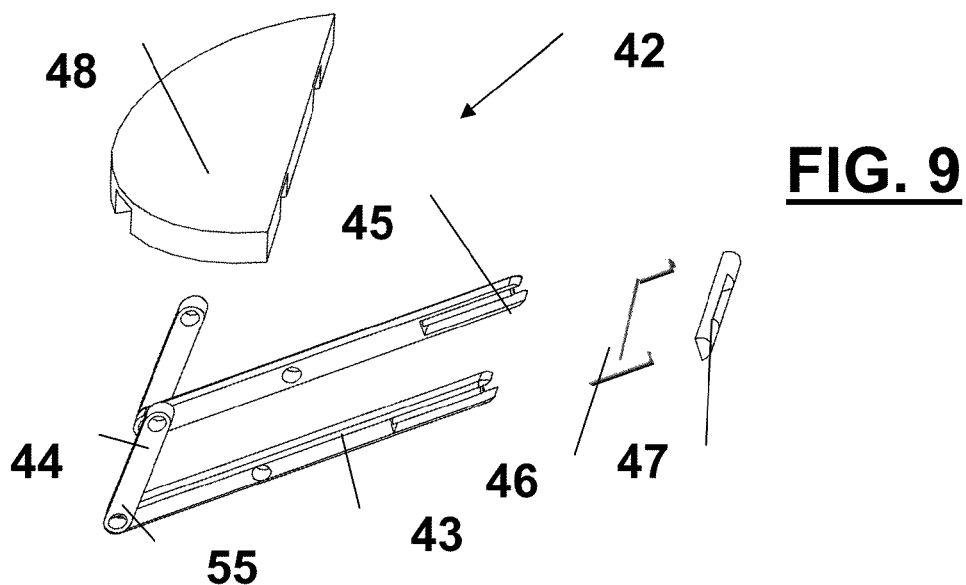
FIG. 9 is an exploded view of the adjusting means of the measuring cup device

In FIG. 9, each set of Levers 43 and 44 are joined together at attach points 55. In FIG. 8, Levers 43 are attached to the fixing member 39 at attach points 54 thereby attaching levers 44 to the fixing member 39. Levers 44 are attached to the disc member 48 at attach point 56 thereby attaching levers 43 to the disc member 48.

Both sets of levers are adapted for measurement accuracy and for causing motion to said adjusting means 42 with respect to the cup cavity 37 for longitudinal movement therein.

Both sets of levers move in communication with respect to one another by pivoting around the attach points of each set so as to facilitate movement of the disc member 48 within the cup cavity 37 for longitudinal movement therein and for positioning the disc member 48 to an accurate measurement volume position with respect to the cup cavity 37.

In FIG. 9, both sets of levers are attached to a spring-loaded catch engagement means 46 at attach points 45 on levers 34. The catch means 46 is adapted for securely fixing both sets levers to a desired measurement volume position with respect to the fixing member 39 thereby fixing the disc member 48 to a desired measurement position with respect to the cup cavity 37.

The catch means 46 includes a reader member 47 for easily selecting a desired measurement amount from one of the plurality of measurement indicia 49 on the outer surface of the fixing member 39 as previously defined and for helping to align the catch means 46 to a notch 41 corresponding to the desired measurement amount.

The catch means 46 is actuated by biasing the catch means 46 inwardly so as to release the catch means 46 from a notch 41 for selecting a new measurement amount on the fixing member 39. When a new measurement amount is selected, the catch means 46 is released at the corresponding notch 41 thereby fixedly engaging the catch means 46 into alignment with a notch 41 in releasable communication with respect thereto. When the catch means 46 is fixedly engaged to a notch 41, the disc member 48 of the adjustment means is simultaneously fixed to an accurate desired measurement volume position with respect to the cup cavity 37.

The area above the disc member 48 represents the desired volume of material to be filled in the measuring cup device 15.

Figure 4:
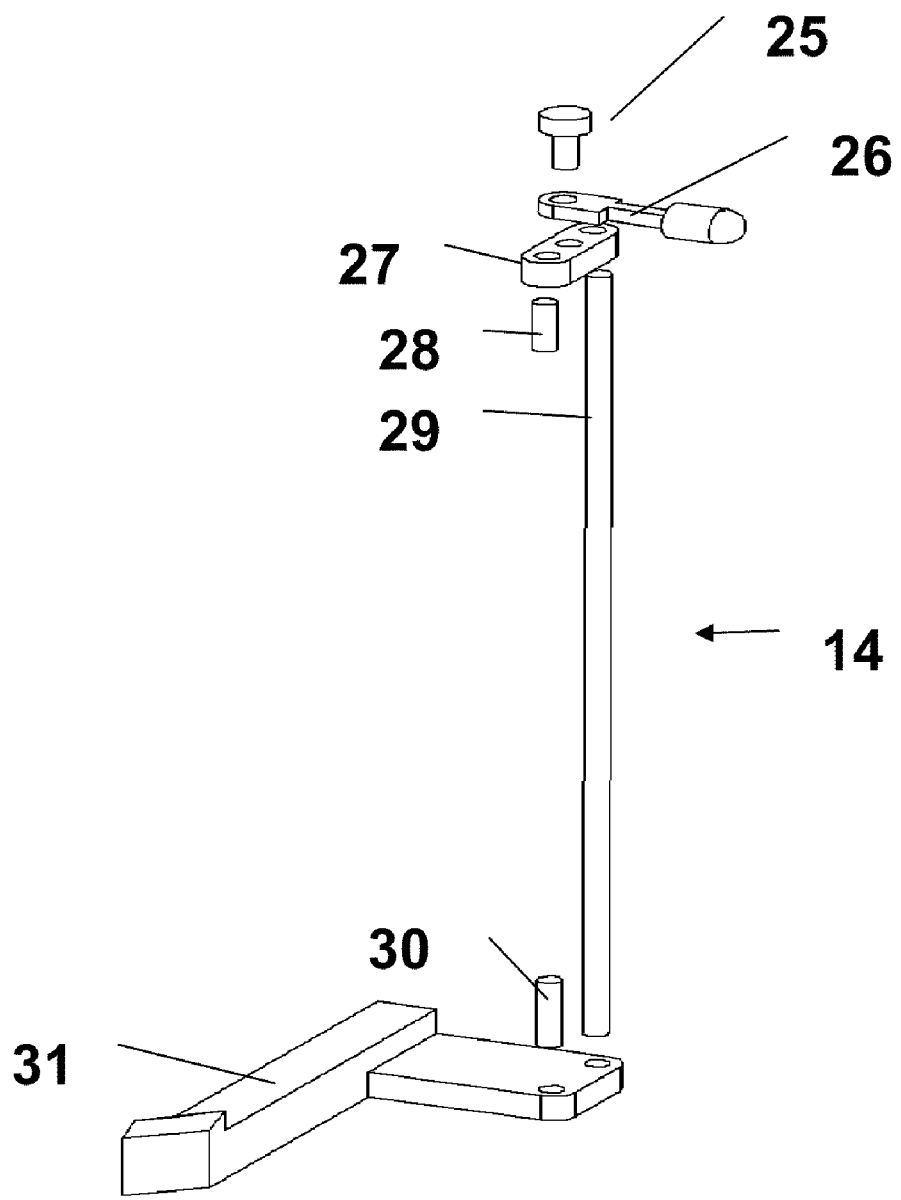
FIG. 4 is an exploded view of the locking means of the apparatus
Figure 5:
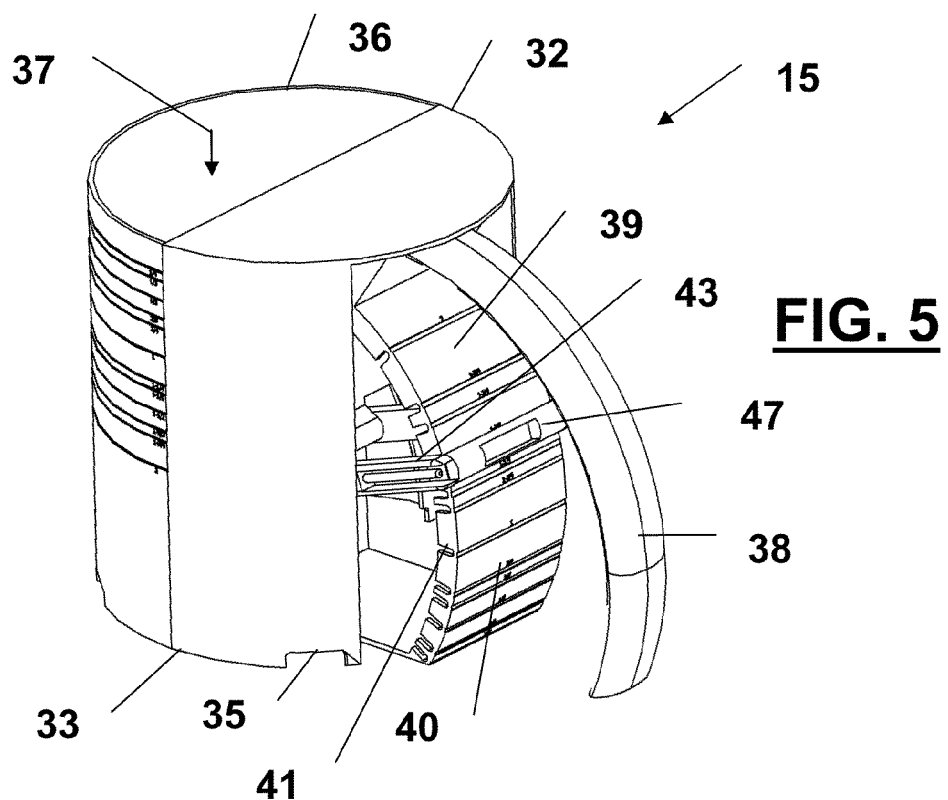
FIG. 5 is a perspective front-view of the measuring cup device
Figure 6:
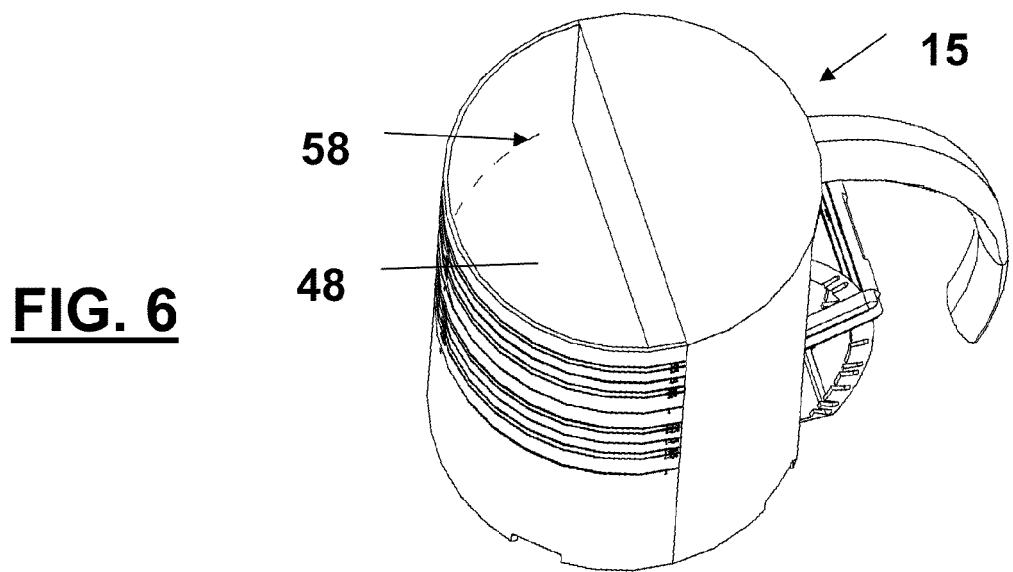
FIG. 6 is an elevational view of the measuring cup device
Figure 7:
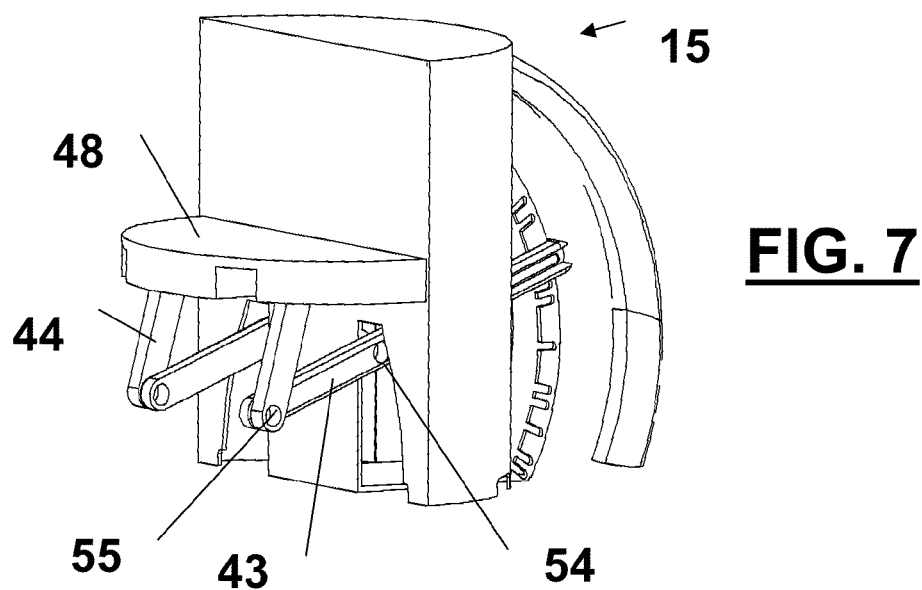
FIG. 7 is a perspective side-view of the measuring cup device

As best illustrated in FIGS. 3 and 4, the main housing further includes a locking means for preventing the dispensing disc lever 5 from being opened when the measuring cup device 5 is removed from the housing compartment 10 and for preventing the measuring cup device 5 from being removed from the housing compartment 10 when the dispensing disc lever 5 is in an open position.

The locking means 14 comprises a lock lever 26 with knob 4 for actuating the locking means 14 into an up or down position. Rod 29 of the locking means 14 connects the lock lever 26 to the partition wall 18 of the apparatus main housing 7 at attach point 20 in FIG. 3 and to the apparatus base 19 at attach point 60 in FIG. 6. A lock shoulder member 27 connects rod 29 to the lock member 31 and to the lock lever 26.

Rod 30 fixes lock member 31 to the base 19 of the apparatus main housing at attach point 61. Lock member 31 is adapted to lock the measuring cup device 15 in the housing compartment 10 so as to prevent spilling when the dispensing lever 5 of the dispensing disc 6 is opened with respect to the dispensing hole 17 of the apparatus partition wall 18.

The lock shoulder member 27 is adapted for housing rod 29, the lock lever 26, and rod 28. Rod 28 is adapted for locking the dispensing lever 5 of the dispensing disc 6 in closed position when the measuring cup device 15 is removed from the housing compartment 10. Lock lever 26 is connected to lock shoulder 27 by attach means 25.

The locking lever 26 extends outwardly with respect to the apparatus as shown in FIG. 1 for selective manipulation thereof. When the locking lever 26 is actuated downwardly, rod 28 is inserted into a slot 23 on the dispensing lever 5 of the dispensing disc thereby locking the dispensing lever 5 in closed position so as to prevent the dispensing hole 17 from being opened when the measuring cup device 15 is removed from the housing compartment 10.

By positioning the locking lever 26 downwardly, rod 18 simultaneously lowers the lock member 29 with respect to the base 19 so that the measuring cup device 15 may be inserted into the housing compartment.

When the locking lever 26 is actuated upwardly, rod 17 is disengaged from the dispensing lever 5 of the dispensing disc 6 so that the dispensing lever 5 can be opened for releasing materials into the measuring cup device 15. By positioning the locking lever 26 upwardly, rod 18 simultaneously lifts lever member 31 so that lever member 31 protrudes from a slot 24 in the base 19. The protrusion of lever member 31 locks the measuring cup device 15 to the base so as to prevent accidentally removing the measuring cup device 15 from the housing compartment 10 when the dispensing lever is opened with respect to the dispensing hole 17.

In operation, the catch means 46 on the measuring cup device 15 is actuated for selecting a desired measurement amount on fixing member 39 as described above. The locking lever 26 is lifted to unlock the dispensing lever 5 for opening the dispensing hole 17. The dispensing lever 5 is opened so as to release the materials from the container reservoir 2 through the dispensing hole 17 into the measuring cup device 15 for filling the measuring cup device 15 to the desired measurement volume of materials. The dispensing lever 5 is returned to closed position for covering the dispensing hole 17 and for leveling the materials in the measuring cup device 15 as previously defined. The locking lever 26 is lowered to lock the dispensing lever 5 in closed position as described above so that the measuring cup device may be removed from the housing compartment for separate use with respect to the apparatus 3. The measuring cup device is removed from the housing compartment by using the handle 38 on the measuring cup device 15 for sliding the measuring cup device out of the housing compartment 10.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An apparatus for storing, dispensing, and measuring dry granular and powdered materials comprising:

an adjustable measuring cup device removably attached to said apparatus for separate use; wherein said measuring cup device is capable of accurately adjusting and measuring a desired volume of said materials dispensed from said apparatus;

a main housing having a main top wall, a bottom base, and a main peripheral wall being attached to and extending between said main top wall and said bottom base; said top wall having a filling hole for filling a container reservoir of said main housing with said dry materials to be dispensed;

a partition wall positioned between said main top wall and said base and extending transverse to a longitudinal axis of said main housing thereby dividing said housing into a top portion and a bottom portion; said top portion defining said container reservoir, said container reservoir being formed in between said top wall and said partition wall for storing said materials to be dispensed; said bottom portion defining a housing compartment formed in between said partition wall and said base for housing said adjustable measuring cup device therein; said partition wall having a dispensing hole extending there-through for distributing said materials from said container reservoir into said measuring cup device; and a dispensing disc rotationally coupled to said partition wall having an outwardly extending lever for facilitating rotation of said dispensing disc into a plurality of opened and closed positions with respect to said dispensing hole of said partition wall.

2. An apparatus for storing, dispensing, and measuring dry granular and powdered materials as claimed in claim 1 wherein said filling hole of said top wall includes a removably attached air-tight lid for covering the container reservoir and to help preserve the freshness of said materials stored in said container cavity.

3. An apparatus for storing, dispensing, and measuring dry granular and powdered materials as claimed in claim 1 wherein said container reservoir further comprises a downwardly sloping ramp for facilitating the distribution of materials from the container reservoir through the dispensing hole and into the measuring cup device below by means of gravity.

4. An apparatus for storing, dispensing, and measuring dry granular and powdered materials as claimed in claim 1 wherein said dispensing hole is configured for alignment into communication with a receiving hole on said measuring cup device.

5. An apparatus for storing, dispensing, and measuring dry granular and powdered materials as claimed in claim 1 wherein said dispensing disc prevents said materials from leaking out of said container when in a fully closed position.

6. An apparatus for storing, dispensing, and measuring dry granular and powdered materials as claimed in claim 1 wherein said bottom base of said apparatus main housing further comprises track guide members for guiding said measuring cup device straight into said housing compartment and into alignment with said dispensing hole.

7. An apparatus for storing, dispensing, and measuring dry granular and powdered materials as claimed in claim 1 wherein when said removable adjustable measuring cup device is inside said housing compartment, a receiving hole and a cup cavity of said measuring cup device are in direct alignment with respect to said dispensing hole of said partition wall of said main housing so as to sufficiently fill said measuring cup device without spilling.

8. An apparatus for storing, dispensing, and measuring dry granular and powdered materials as claimed in claim 1 wherein said removable adjustable measuring cup device is capable of accurately measuring a volume of said materials dispensed from said apparatus, said measuring cup device further comprising:

- a main cup body having a cup top end and a cup bottom end;
- a peripheral cup wall being attached to and extending between said cup top end and said cup bottom end;
- a handle on said peripheral cup wall;
- track guide slots on said cup bottom end for guiding said measuring cup device straight into said housing compartment and into alignment with said dispensing hole of said partition wall of said apparatus main housing;
- a receiving hole on said cup top end for aligning into communication with said dispensing hole of said partition wall of said apparatus main housing; wherein said receiving hole on said top end extends downwardly and through to said cup bottom end so as to form a cup cavity for receiving said materials from said container reservoir for measuring;
- an adjusting means for selectively adjusting the volume of said cup cavity into a plurality of accurate predetermined measurement volumes; and a fixing member for fixing said adjustment means to a desired measurement volume position with respect to said cup cavity.

9. An apparatus for storing, dispensing, and measuring dry granular and powdered materials as claimed in claim 8 wherein said adjusting means for selectively adjusting the volume of said cup cavity into a plurality of accurate predetermined measurement volumes, further comprises:

- a cup disc member slidably disposed for longitudinal movement with respect to said cup cavity for adjusting the volume of said cup cavity into a plurality of accurate predetermined measurement volumes; wherein said cup disc member has sufficient contacting relation with respect to cup cavity inner walls so as to form a substantial seam between said disc member and said cavity inner walls for preventing materials from passing through said seam;
- a plurality of lever means adapted for measurement accuracy and for causing motion to said adjusting means with respect to said cup cavity for longitudinal movement therein; and
- a catch means for fixedly engaging to said fixing member of said measuring cup device.

10. An apparatus for storing, dispensing, and measuring dry granular and powdered materials as claimed in claim 8 wherein said fixing member for fixing said adjustment means to a desired measurement volume position with respect to said cup cavity further comprises a plurality of notches.

11. An apparatus for storing, dispensing, and measuring dry granular and powdered materials as claimed in claim 10 wherein said fixing member further comprises a plurality of selectable measurement indicia positioned on an outer surface of said fixing member; and wherein each of said measurement indicia is positioned adjacent to a corresponding one of said plurality of notches.

12. An apparatus for storing, dispensing, and measuring dry granular and powdered materials as claimed in claim 11 wherein said adjusting means is adapted for fixedly and releasably engaging with each of said plurality of said notches of said fixing member so as to securely fix said adjusting means to a desired measurement volume position with respect to said cup cavity.

13. An apparatus for storing, dispensing, and measuring dry granular and powdered materials as claimed in claim 1 wherein said main housing of said apparatus further comprises a locking means for preventing said dispensing disc from being opened when said measuring cup device is removed from said housing compartment and for preventing said measuring cup device from being removed from said housing compartment when said dispensing disc is in an open position.

\* \* \* \* \*